United States Patent
Chauhan (10) Patent No.: US 9,282,286 B2
(45) Date of Patent: Mar. 8, 2016

(54) PARTICIPATING IN AN ONLINE MEETING WHILE DRIVING

(71) Applicant: Citrix Systems, Inc., Fort Lauderdale, FL (US)

(72) Inventor: Abhishek Chauhan, Saratoga, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 21 days.

(21) Appl. No.: 14/198,954

(22) Filed: Mar. 6, 2014

(65) Prior Publication Data

US 2015/0256795 A1    Sep. 10, 2015

(51) Int. Cl.
| | |
|---|---|
| H04N 7/15 | (2006.01) |
| H04L 29/08 | (2006.01) |
| H04L 29/06 | (2006.01) |
| B60R 1/00 | (2006.01) |
| H04N 7/14 | (2006.01) |
| G06Q 10/10 | (2012.01) |

(52) U.S. Cl.
CPC .. *H04N 7/15* (2013.01); *B60R 1/00* (2013.01); *G06Q 10/10* (2013.01); *H04L 65/403* (2013.01); *H04L 67/12* (2013.01); *H04N 7/147* (2013.01)

(58) Field of Classification Search
CPC ........... H04N 7/15; H04N 7/152; H04N 7/14; H04N 7/142
USPC ............................................ 348/14.01–14.16
See application file for complete search history.

(56) References Cited

U.S. PATENT DOCUMENTS

| | | | |
|---|---|---|---|
| 6,711,379 B1 | 3/2004 | Owa et al. | |
| 2008/0255840 A1* | 10/2008 | Cutler | ............................ 704/246 |
| 2010/0007711 A1 | 1/2010 | Bell | |
| 2010/0077437 A1* | 3/2010 | McManus et al. | ............... 725/75 |
| 2012/0063573 A1* | 3/2012 | Sylvain | ......................... 379/67.1 |
| 2014/0136630 A1* | 5/2014 | Siegel et al. | ................... 709/206 |
| 2014/0282262 A1* | 9/2014 | Gregotski et al. | ............. 715/838 |

FOREIGN PATENT DOCUMENTS

| | | |
|---|---|---|
| BE | 1008888 A6 | 8/1996 |
| EP | 2615843 A1 | 7/2013 |
| JP | 2013093691 | 5/2013 |

OTHER PUBLICATIONS

International Search Report and Written Opinion of the International Searching Authority, International Application No. PCT/US2015/017987, International Filing Date Feb. 27, 2015, Applicant Citrix Systems. Inc., 10 pages.

* cited by examiner

*Primary Examiner* — Melur Ramakrishnaiah
(74) *Attorney, Agent, or Firm* — BainwoodHuang (57) ABSTRACT

A technique enables a user to participate in an online meeting. The technique involves receiving, by processing circuitry of a vehicle, a join instruction to join the online meeting. The technique further involves performing, by the processing circuitry of the vehicle, a communications exchange with a remote online meeting server in response to the join instruction, the communications exchange establishing an online meeting session with the remote online meeting server to join the processing circuitry of the vehicle to the online meeting. The technique further involves outputting, after the online meeting session is established and by the processing circuitry of the vehicle, video of the online meeting on a display screen which is integrated with the vehicle. Along these lines, the display screen can output a static image while the vehicle is moving and moving video while the vehicle is not moving (e.g., parked).

21 Claims, 5 Drawing Sheets

PARTICIPATING IN AN ONLINE MEETING WHILE DRIVING

BACKGROUND

To join a web conference, human participants connect their respective client devices to a web conference server over a network. Example client devices include desktop computers, laptop computers, tablets, smart phones, and conference room conferencing devices.

Once the client devices have joined the web conference, each participant is able to provide video and audio to the web conference server. The web conference server then shares the video (e.g., multiple web cameras views, a slide show of a presentation, etc.) and audio (e.g., an aggregate audio signal of all the participants) among the client devices. Accordingly, the participants are able to view visual content, as well as inject comments and ask questions to form a collaborative exchange even though the participants may be scattered among remote locations.

SUMMARY

Unfortunately, there are deficiencies to the above-described conventional web conference in which participants simply share video and audio content among each other. For example, the conventional web conference is not well suited for human participants in vehicles. Along these lines, the conventional web conference may include moving video such as a live web camera feed from each participant, a slide show perhaps with motion from a human presenter, and so on. However, various laws and regulations typically prohibit display of such moving video to drivers of vehicles. Moreover, display of moving video to active drivers of vehicles can be distracting and thus poses a safety issue.

In contrast to the above-described conventional web conference in which participants simply share video and audio content among each other, improved techniques enable users to safely and effectively operate vehicles while concurrently participating in online meetings. To this end, video of an online meeting can be displayed on an electronic display screen which is integrated with the vehicle. While the vehicle is in motion (i.e., while a user drives and concurrently engages in the online meeting via audio), the video shows a static image. However, the vehicle is not in motion (e.g., when the user has pulled over to the side of the road, when the user is parked in a parking lot, etc.) the video is allowed to include moving images. Accordingly, the user is able to utilize the display screen of the vehicle for an online meeting in a safe and law abiding manner.

One embodiment is directed to a method of participating in an online meeting. The method includes receiving, by processing circuitry of a vehicle, a join instruction to join the online meeting. The method further includes performing, by the processing circuitry of the vehicle, a communications exchange with a remote online meeting server in response to the join instruction, the communications exchange establishing an online meeting session with the remote online meeting server to join the processing circuitry of the vehicle to the online meeting. The method further includes outputting, after the online meeting session is established and by the processing circuitry of the vehicle, video of the online meeting on a display screen which is integrated with the vehicle.

In some arrangements, outputting the video of the online meeting on the display screen includes receiving a motion signal indicating whether the vehicle is in motion. When the motion signal indicates that the vehicle is in motion, a first video of the online meeting is displayed on the display screen (e.g., a static image signal is provided to the display screen to display a static image. However, when the motion signal indicates that the vehicle is not in motion, a second video of the online meeting is displayed on the display screen (e.g., a moving image signal is provided to the display screen to display a moving image).

In some arrangements, the method further includes outputting, regardless of whether the motion signal indicates that the vehicle is in motion, audio of the online meeting on a set of speakers while the video of the online meeting is concurrently outputted on the display screen. The set of speakers can be integrated with the vehicle (e.g., the same set of speakers that are used to play broadcasted radio content by the vehicle radio tuner). Alternatively, the set of speakers can be part of a separate user device (e.g., a separate client apparatus such as a smart portable device which independently joins the online meeting).

In some arrangements, outputting audio of the online meeting on the set of speakers includes providing audio of a person who is currently talking in the online meeting. While the motion signal indicates that the vehicle is in motion, the display screen may render a frozen video frame of the person who is currently talking, a picture icon of the person who is currently talking, a static slide of a slide show, a blank or default screen, and so on. Accordingly, the user is not distracted while driving the vehicle.

In some arrangements, the processing circuitry of the vehicle communicates with a remote online meeting server in a wireless manner. For example, the processing circuitry can exchange online meeting communications over a cellular communications channel established between the vehicle and the online meeting server.

In some arrangements, the cellular communications channel established between the vehicle and the online meeting server is used just for video content exchange. In these arrangements, a separate client apparatus (e.g., a tablet, a smart phone, etc.) communicates with the online meeting server via a separate cellular communications channel for audio exchange.

When such a separate client apparatus is available, the processing circuitry of the vehicle may be able to coordinate its operation with the separate client apparatus via a local communications pathways (e.g., Bluetooth). In some arrangements, a user is able to join an online meeting by providing a command to the processing circuitry of the vehicle; the processing circuitry responds by joining the online meeting (e.g., for video) as well as directing the separate client apparatus to join the online meeting (e.g., for audio). In other arrangements, a user is able to join an online meeting by providing a command to the separate client apparatus; the separate client apparatus responds by joining the online meeting (e.g., for audio) as well as directing the processing circuitry of the vehicle to join the online meeting (e.g., for video).

Another embodiment is directed to a vehicle which includes a passenger compartment having a display screen, a drive section which is constructed and arranged to move the passenger compartment among different locations, and processing circuitry coupled to the passenger compartment and the drive section. The processing circuitry is constructed and arranged to:
  (A) receive a join instruction to join the online meeting,
  (B) perform a communications exchange with a remote online meeting server in response to the join instruction, the communications exchange establishing an online meeting session with the remote online meeting server to join the processing circuitry of the vehicle to the online meeting, and (C) after the online meeting session is established, output video of the online meeting on the display screen.

Yet another embodiment is directed to a computer program product having a non-transitory computer readable medium which stores a set of instructions to involve a participant in an online meeting. The set of instructions, when carried out by processing circuitry of a vehicle, causes the processing circuitry of the vehicle to perform a method of:

(A) receiving a join instruction to join the online meeting;

(B) performing a communications exchange with a remote online meeting server in response to the join instruction, the communications exchange establishing an online meeting session with the remote online meeting server to join the processing circuitry of the vehicle to the online meeting; and (C) after the online meeting session is established, outputting video of the online meeting on a display screen which is integrated with the vehicle.

It should be understood that, in the cloud context, certain computerized circuitry such as that used for the online meeting server is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry which are involved in enabling users to participate in online meetings while driving.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique enables a user to safely and effectively operate a vehicle while concurrently participating in an online meeting. Along these lines, video of the online meeting is displayed on an electronic display screen which is integrated with the vehicle. While the vehicle is in motion (i.e., while the user drives and concurrently engages in the online meeting via audio only), the video shows a static image (or goes dark). However, when the vehicle is not in motion (e.g., when the user has pulled over to the side of the road, when the user is parked in a parking lot, etc.) the video is allowed to include moving images for viewing by the user. As a result, the user is able to utilize the display screen of the vehicle for the online meeting in a safe and law abiding manner.

Figure 1:
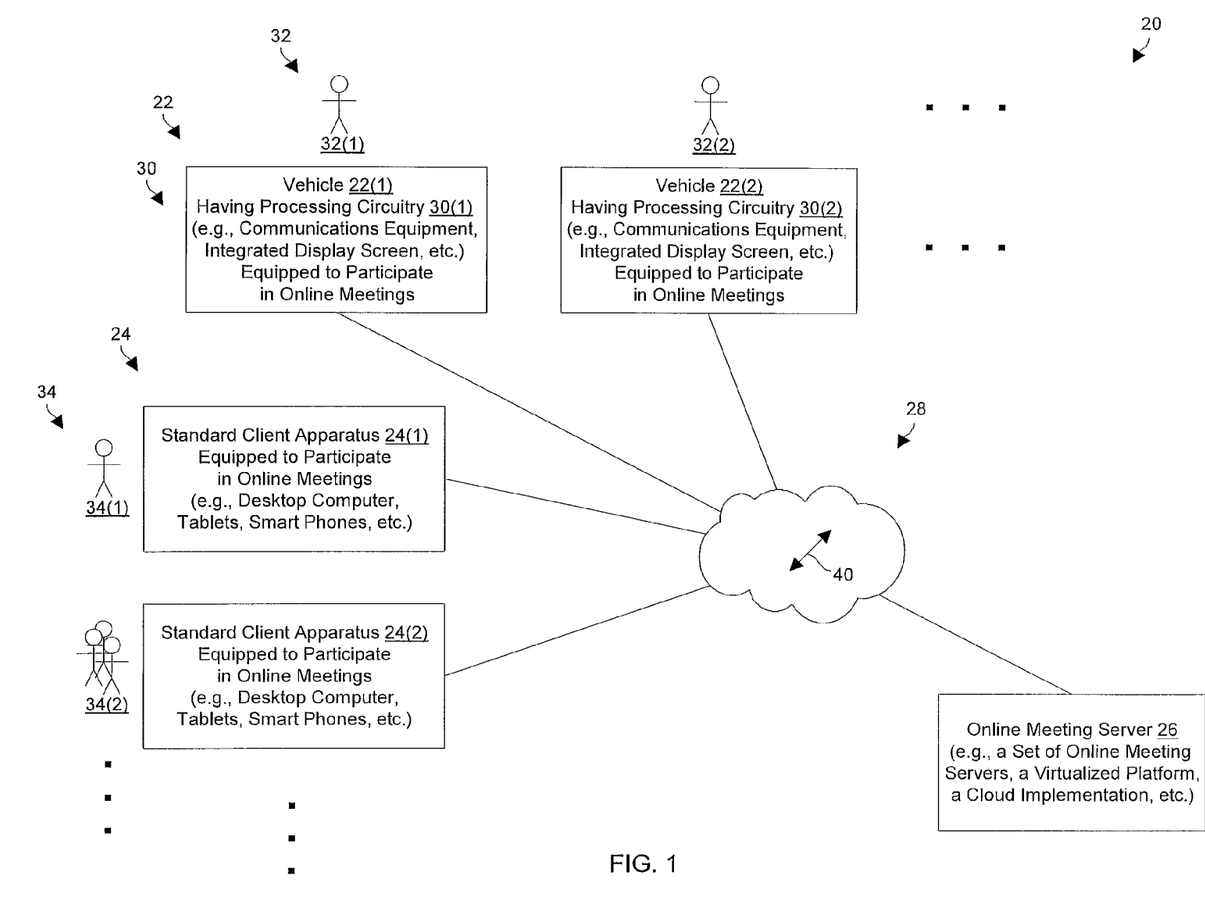
FIG. 1 is a block diagram of an electronic environment which is suitable for an online meeting including at least one user connecting to the online meeting from a vehicle.

FIG. 1 shows an electronic environment 20 which is suitable for an online meeting in which at least one user connects to the online meeting from a vehicle. The electronic environment 20 includes vehicles 22(1), 22(2), . . . (collectively, vehicles 22), standard client apparatus 24(1), 24(2), . . . (collectively, client apparatus 24), an online meeting server 26, and communications medium 28.

Each vehicle 22 includes processing circuitry 30 which is constructed and arranged to participate in an online meeting on behalf of a respective user 32 while that user 32 resides in the vehicle 22. For example, the processing circuitry 30(1) of the vehicle 22(1) operates on behalf of a vehicle user 32(1). Similarly, the processing circuitry 30(2) of the vehicle 22(2) operates on behalf of a vehicle user 32(2), and so on.

Each standard client apparatus 24 is constructed and arranged to participate in an online meeting on behalf of a respective non-vehicle user 34. That is, the client apparatus 24(1) operates on behalf of a non-vehicle user 34(1), the client apparatus 24(2) operates on behalf of a non-vehicle user 34(2), and so on. Examples of standard client apparatus 24 include desktop computers, laptop computers, tablets, smart phones, conference room conferencing devices, and the like.

The online meeting server 26 is constructed and arranged to host online meetings on behalf of vehicle users 32 and non-vehicle users 34. The online meeting server 26 may be implemented as a set of servers (e.g., a server farm), on a virtualized platform, in the cloud, etc. To this end, the online meeting server 26 can include an online meeting engine to host multiple online meetings concurrently. For each online meeting, the online meeting server 26 shares video and an aggregate audio signal among participants. For example, some online meetings can include only vehicle users 32. Additionally, other online meetings can include a combination of vehicle users 32 and non-vehicle users 34, and so on. Furthermore, more than one user 32, 34 may participate in an online meeting from a single location such as from a conference room (e.g., see users 34(2) at the client apparatus 24(2)).

The communications medium 28 is constructed and arranged to connect the various components of the electronic environment 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, cellular communications, plain old telephone service (POTS) based communications, combinations thereof, etc.

During operation, the users 32, 34 operate their respective equipment to join and participate in online meetings. In connection with the vehicles 22, the processing circuitry 30 is constructed and arranged to output video of the online meetings on vehicle display screens. In particular, while the vehicles 22 are moving (i.e., while the users 32 are driving the vehicles 22), the processing circuitry 30 renders static images of the online meetings on the vehicle display screens (e.g., frozen images, user icons, a default screen, a blank screen, etc.). As a result, the vehicle users 32 are not distracted by the video.

However, while the vehicles 22 are not moving (i.e., while the vehicles 22 are stationary or parked), the processing circuitry 30 allows rendering of moving images of the online meetings on the vehicle display screens (e.g., moving faces of the online meeting participants, a slides with motion, etc.). Here, the vehicle users 32 are able to be more engaged in the online meetings since the vehicle users 32 are not currently driving the vehicles 22.

It should be understood that the processing circuitry 30 of the vehicles 22 is capable of automatically controlling whether static images or moving images are rendered on the integrated display screens of the vehicles 22. Along these lines, a variety of techniques are suitable for determining whether the users 32 are driving the vehicles such as wheel sensors, GPS circuitry, accelerometers, control circuitry of the vehicles 22, and so on. Accordingly, the processing circuitry 30 of each vehicle 22 has access to a motion signal indicating whether the vehicle 22 is in motion (or alternatively in gear). The processing circuitry 30 is able to then control whether to render static images or moving images based on that motion signal.

Additionally, the integrated display screens may be electronic monitors (e.g., in the vehicle dashboards) which are further used to display other information such as GPS information, music/song details, restaurant menus, and so on Likewise, the audio of the online meetings may be output on a set of speakers which are integrated in the vehicle to play broadcasted radio station content, to output GPS directions, etc. Further details will now be provided with reference to FIG. 2.

Figure 2:
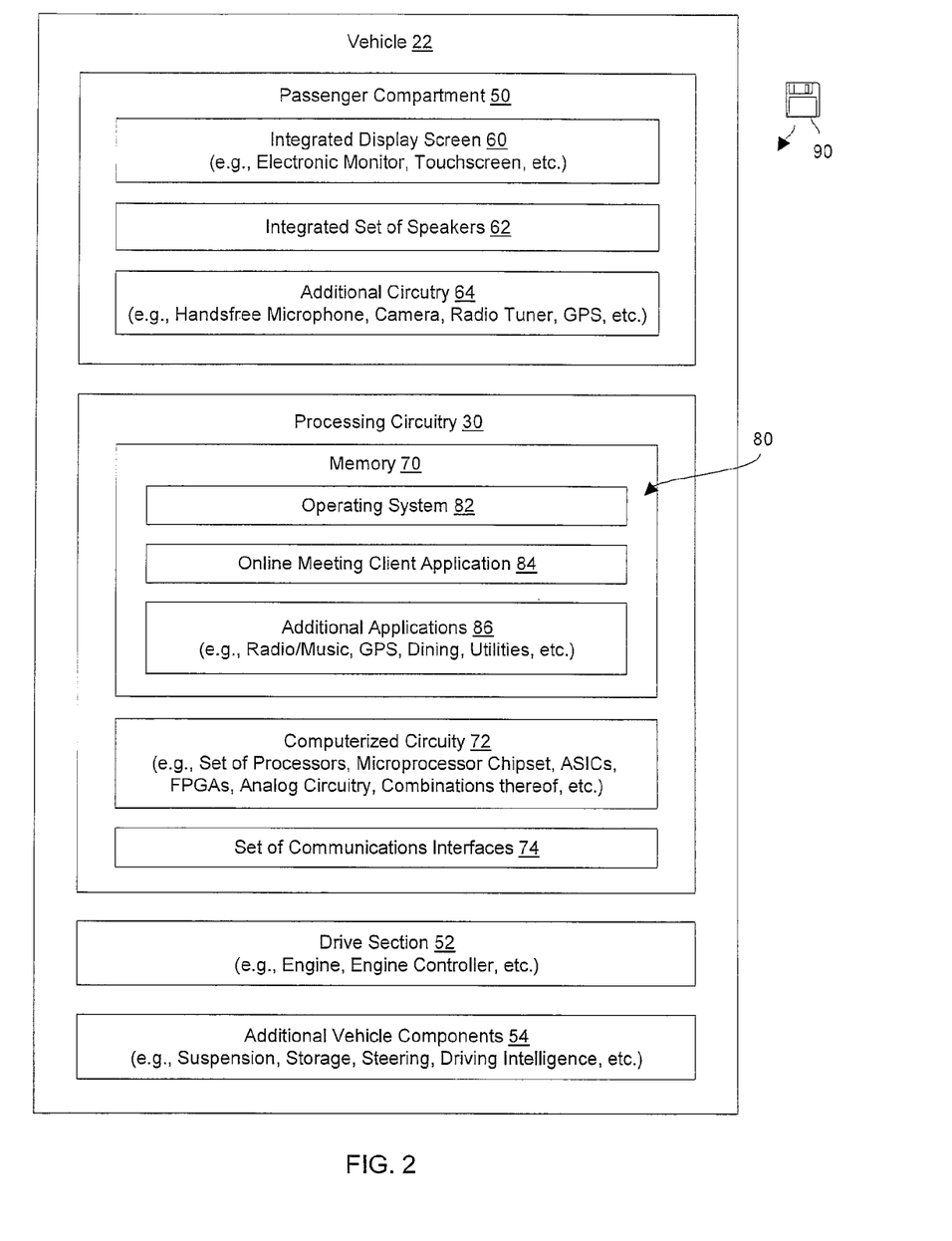
FIG. 2 is a block diagram of particular details of the online meeting of FIG. 1.

FIG. 2 shows particular details of a vehicle 22 which is equipped to participate in online meetings. The vehicle 22 includes a passenger compartment 50, processing circuitry 30, a drive section 52, and other vehicle components 54.

The passenger compartment 50 is constructed and arranged to house one or more vehicle users 32 and to enable the vehicle users 32 to operate the vehicle 22. The passenger compartment 50 includes, among other things, an integrated display screen 60, an integrated set of speakers 62, and additional circuitry 64.

The processing circuitry 30 is constructed and arranged to perform a variety of operations on behalf of the vehicle users 32. The processing circuitry 64 includes memory 70, computerized circuitry 72, and a set of communications interfaces 74.

The drive section 52 is constructed and arranged to move the vehicle 22 among different locations. The drive section 52 includes a means of propulsion (e.g., an engine or motor, a transmission, wheels, etc.), a power source (e.g., a fuel tank, a set of batteries, etc.), and so on.

The additional vehicle components 54 represent other portions of the vehicle 22 such as a suspension, storage, steering, driving intelligence, and so on. In some arrangements, the additional vehicle components 54 includes control circuitry which is capable of operating and/or driving the vehicle 22 automatically, e.g., outputting a current location and status, sensing neighboring objects, deploying airbags, calling for help or assistance, automatically applying brakes or sounding alerts, automatically parking the vehicle 22, automatically steering and self-driving the vehicle 22, and so on.

With reference back to the processing circuitry 30, the memory 70 is intended to represent both volatile storage (e.g., DRAM, SRAM, etc.) and non-volatile storage (e.g., flash memory, magnetic disk drives, etc.). The memory 70 stores a variety of software constructs 80 including an operating system 82, an online meeting client application 84, and additional applications 86 (e.g., radio/music applications, a GPS application, dining and special places menus, tools and utilities, and so on.

The computerized circuitry 72 of the processing circuitry 30 can include a variety of hardware circuits such as a microprocessor chipset or a set of processors, ASICs, FPGAs, analog circuitry, discrete components, combinations thereof, etc. The computerized circuitry 72 is constructed and arranged to operate in accordance with the various software constructs 80 stored in the memory 70. In particular, the computerized circuitry 72, when executing the operating system 82, manages various resources (e.g., memory allocation, processor cycles, access to the communications interface, etc.).

Additionally, the computerized circuitry 72, when executing the online meeting client application 84, forms an online meeting client which joins the vehicle users 32 to an online meeting and enables the vehicle users 32 to participate in an effective and safe manner. Furthermore, the computerized circuitry 72, when executing the additional applications 86, enables the vehicle users 32 to perform other operations such as listen to broadcasted radio station content, navigate based on GPS assistance, review restaurant menus, search for special places, and so on.

The set of communications interfaces 74 is constructed and arranged to connect the processing circuitry 30 to the communications medium 28 (also see FIG. 1). Accordingly, the set of communications interfaces 74 enables the vehicle 22 to communicate with the other components of the electronic environment 20 (FIG. 1). Such communications may be copper-based or wireless (i.e., IP-based, cellular-based, use Bluetooth, combinations thereof, and so on).

In the context of computerized circuitry 72 executing software constructs 80, a computer program product 90 is capable of delivering all or portions of the software to the vehicle 22. The computer program product 90 has a non-transitory and non-volatile computer readable medium which stores a set of instructions to control one or more operations of the vehicle 22. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
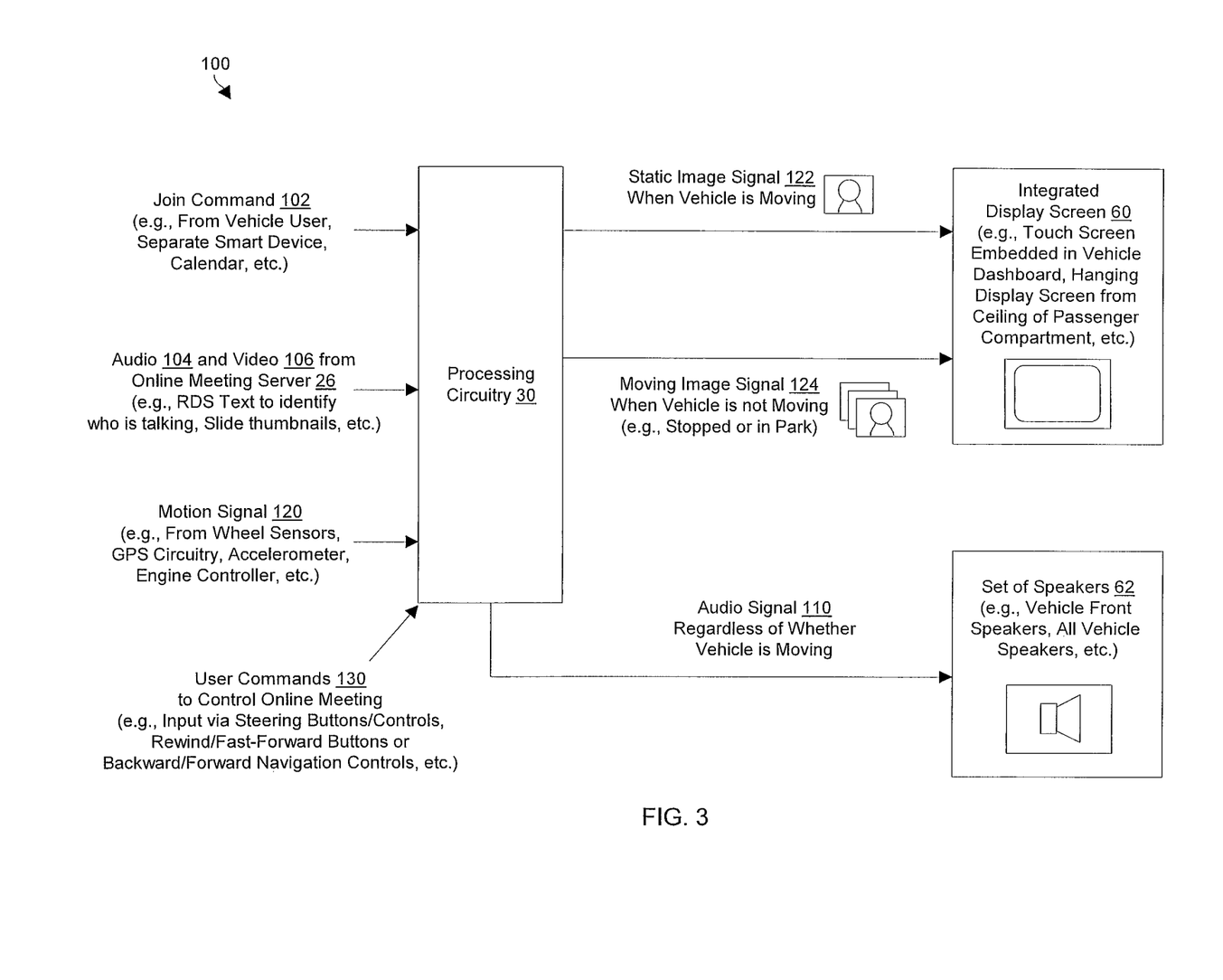
FIG. 3 is a block diagram of additional details of the online meeting of FIG. 1.

FIG. 3 shows an online meeting situation 100 in which the integrated display screen 60 and the integrated set of speakers 62 of the vehicle passenger compartment 50 are used during an online meeting (also see FIG. 2). It should be understood that the vehicle passenger compartment 50 includes additional circuitry (e.g., a microphone for receiving audio, a camera for receiving video, backward and forward audio system navigation buttons, etc.) which are also involved in the online meeting but are not shown in FIG. 3 for simplicity.

Initially, the processing circuitry 30 of the vehicle 22 receives a join command 102 to join an online meeting. In some arrangements, receiving the join command 102 involves the vehicle user 32 entering an online meeting identifier (ID) and/or particular meeting details into a user interface of the vehicle 22 (e.g., the display screen 60 if the display screen 60 is a touch screen, a remote controller of the vehicle 22, a microphone if voice/speech recognition is available, etc.). In other arrangements, receiving the join command 102 involves receiving a wireless instruction from a separate smart device (e.g., a tablet or a smart phone of the vehicle user 22 where the online meeting is already programmed into the separate smart device). Other arrangements are suitable as well such as automatically prompting the vehicle user 32 to join a pre-scheduled online meeting from a calendar utility and receiving approval via a button press, and so on.

In response to the join command 102, the processing circuitry 30 joins the online meeting via a communications interface 74 (FIG. 2). In particular, the processing circuitry 30 performs a communications exchange with the online meeting server 26 in response to the join command 102 to establish an online meeting session with the online meeting server 26 (FIG. 1). Along these lines, the processing circuitry 30 may already have connectivity with the Internet (e.g., when the vehicle is within WiFi range, via an established cellular communications pathway, etc.) and the processing circuitry 30 simply joins the online meeting in a traditional manner through the available connectivity. Alternatively, the processing circuitry 30 may establish new connectivity with the Internet or via a cellular phone call in response to the join command 102.

After the processing circuitry 30 joins the online meeting, the processing circuitry 30 receives audio 104 and video 106 from the online meeting server 26, and outputs the audio 104 and video 106 from the online meeting 26 on the integrated display screen 60 and the integrated set of speakers 62. Additionally, the vehicle user 32 is able to contribute audio and video to the online meeting.

In connection with the audio 104, the processing circuitry 30 outputs an audio signal 110 to the integrated set of speakers 62 regardless of whether the vehicle 22 is moving. The audio signal 110 may include the full audio 104 from the online meeting server 26, e.g., an aggregate signal which includes audio input from all of the meeting participants. In some arrangements, the processing circuitry 30 performs echo cancellation/suppression to prevent audio feedback and echoing. Accordingly, the vehicle user 32 is robustly and reliably able to participate in the online meeting.

In connection with the video 106, the processing circuitry 30 receives a motion signal 120 which indicates whether the vehicle 22 is moving. When the motion signal 110 indicates that the vehicle 22 is moving, the processing circuitry 30 outputs a static image signal 122 to the integrated display screen 60 (e.g., a frozen video frame of the particular person who is talking, a frozen slide of a slide show presentation of a presenter, a blank or dark screen, a default screen, etc.). Accordingly, the static image signal 122 does not include any motion and thus is not distracting to the vehicle user 32.

When the motion signal 120 indicates that the vehicle 22 is not moving (or that the vehicle 22 is parked), the processing circuitry 30 outputs a moving image signal 124 to the integrated display screen 60 (e.g., a series of video frames of the particular person who is talking, a slide with motion, a combination of moving and non-moving video, etc.). Accordingly, the moving image signal 124 may include motion which enhances the vehicle user's online meeting experience. Nevertheless, such rendering of motion does not pose a safety concern since the vehicle 22 is stopped.

Moreover, it should be understood that various elements of the vehicle's standard audio system can be leveraged to enable the user to more easily operate various aspects of the online meeting. Such elements include existing vehicle audio system buttons and controls (e.g., steering mounted buttons/controls, dashboard controls, etc.), and the capabilities of the existing vehicle audio system to display various types of data such as radio data system (RDS) text (e.g., song titles for songs played over Bluetooth, etc.), album art, and so on.

For example, in some arrangements, the processing circuitry 30 shows the name of the person currently speaking in the online meeting in a name field on the display screen 60. As different people speak during the online meeting, the contents of the name field dynamically change to inform the user of the vehicle who is currently speaking. In some arrangements, the "who is talking" data is input into the audio system of the vehicle via the same API which is used to receive standard RDS data available in FM radio broadcasts thus enabling the vehicle to process and display the "who is talking" data in the same manner as RDS text.

As another example, in some arrangements, the processing circuitry 30 re-displays earlier outputted video of the online meeting on the display screen 60 in response to user commands 130 such as backward and forward navigational input. Along these lines, the user can navigate through the online meeting backward in time and/or forward in time to see who was speaking earlier, to view an earlier slide, and so on. In some arrangements, the user commands 130 are input using the same or similar buttons and controls which are used to navigate backward or forward when playing music (e.g., multiple clicks further back or forward via the steering mounted controls, dashboard controls, a vehicle remote control device, etc.).

As yet another example, in some arrangements, the processing circuitry 30 displays thumbnail images of the online meeting on the display screen 60 in response to user commands 130 such as backward and forward navigational input. Along these lines, the user can navigate backward in time and/or forward in time to view thumbnail images of the online meeting such as thumbnail images of speakers, slides, etc.). Here, the thumbnail data can be input into the audio system of the vehicle via the same API that receives album art for a currently playing song thus enabling the vehicle to process and display the thumbnail data in the same manner. Again, the user commands 130 can be input using the same or similar buttons and controls which are used to navigate backward or forward when playing music.

In view of the above description, it should be understood that the online meeting is capable of 'masquerading' as content for an audio-player of the vehicle. That is, the vehicle's audio system communicates externally in a manner similar to that of communicating with an external smart phone or tablet when retrieving music to play. In some arrangements, the online meeting is adapted to seamlessly integrate with the vehicle's audio system so that no custom integration or modification is necessary. Rather, the online meeting content, communications, and control fits into the current envelope of what is currently available for audio and video in the vehicle. Further details will now be provided with reference to FIG. 4.

Figure 4:
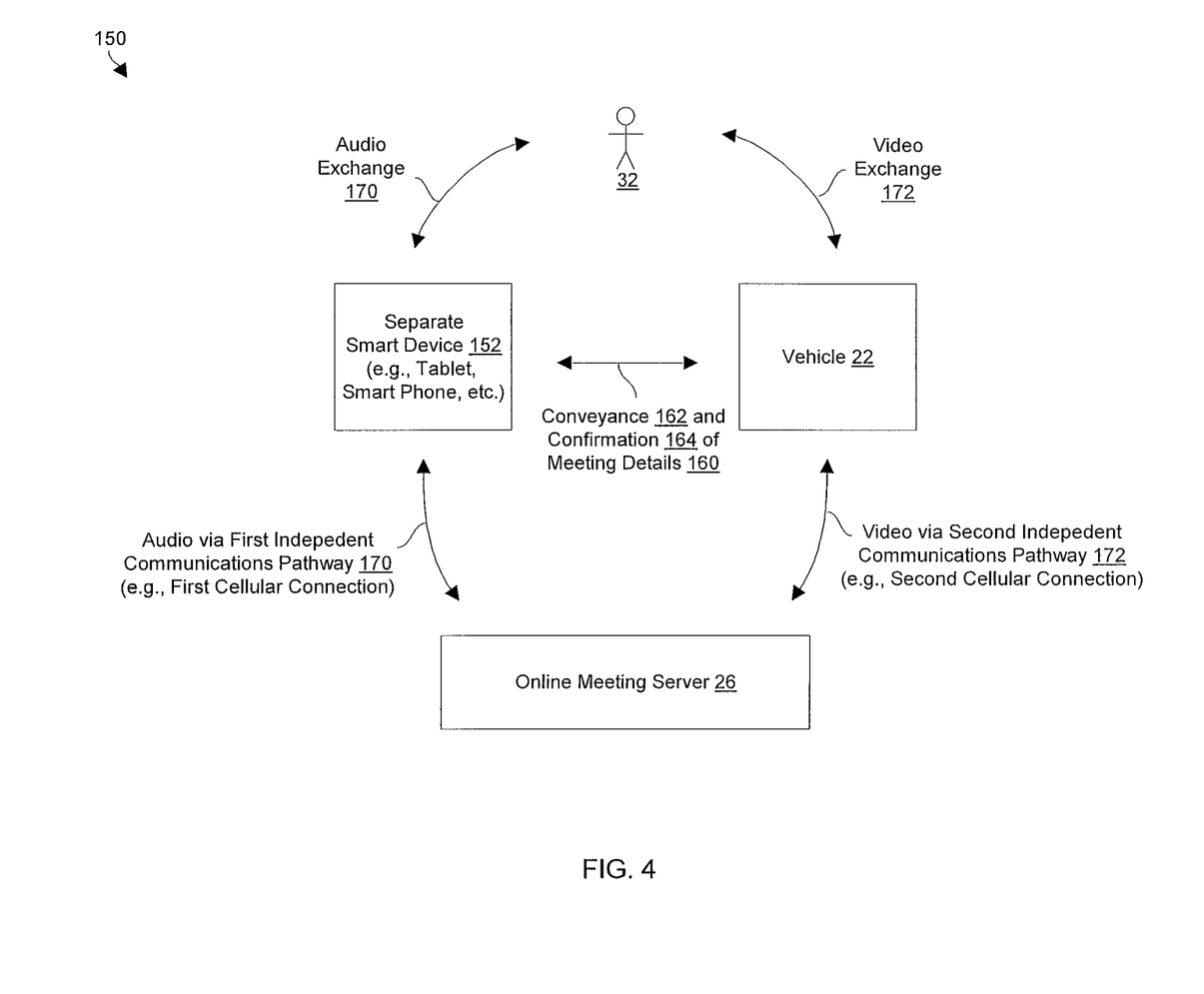
FIG. 4 is a block diagram of a situation in which a user involves a vehicle and a separate client apparatus in an online meeting.

FIG. 4 shows a situation 150 in which a vehicle user 32 utilizes a vehicle 22 as well as a separate smart device 152 (e.g., a tablet, a smart phone, etc.) during an online meeting. First, suppose that the vehicle user 32 has a particular online meeting already programmed into the separate smart device 152. For example, the vehicle user 32 may have an online meeting invite in the form of link of an email or a calendar entry. Alternatively, the vehicle user 32 may enter an online meeting ID and/or other online meeting details into the smart device 152.

When the vehicle user 32 is ready to join the online meeting, the vehicle user 32 conveys the online meeting details 160 from the separate smart device 152 to the processing circuitry 30 (FIG. 2) of the vehicle 22. Such a conveyance 162 of the online meeting details 160 to the vehicle 22 may be through cabling (e.g., a USB cable) or via wireless communications (e.g., Bluetooth, WiFi, etc.). The processing circuitry 30 returns confirmation 164 to the separate smart device 152.

During this time, the vehicle user 32 is able to tailor whether the vehicle 22 is to be used for audio and/or video of the online meeting, and whether the separate smart device 152 is to be used for audio and/or video of the online meeting. For example, the vehicle user 32 may wish to utilize the vehicle 22 for both audio and video. Alternatively, the vehicle user 32 may wish to utilize the vehicle 22 for video only and use the separate smart device 152 for audio only, and so on. By way of example, FIG. 4 shows the vehicle user 32 providing audio exchange 170 via the separate smart device 152 only (i.e., audio from the vehicle 22 is disabled), and video exchange 172 via the vehicle 22 only (i.e., video from the smart device 152 is disabled).

It should be understood that both the vehicle 22 and the separate smart device 152 have independent capability of establishing connectivity to the communications medium 28 (FIG. 1). Along these lines, if the vehicle user 32 utilizes the vehicle 22 for both audio and video, the vehicle user 32 may still use the separate smart device 152 for connectivity For example, the separate smart device 152 may operate as a network hot spot and establish a communications channel 180 such as a cellular connection to the online meeting server 26. Alternatively, the vehicle user 32 may use the vehicle's communications interface 74 (FIG. 2) to establish a communications channel 182 such as a cellular connection to the online meeting server 26.

Likewise, if the vehicle user 32 uses the vehicle 22 for video only and the separate smart device 152 for audio only, the vehicle user 32 has a choice of using the vehicle user 32 or the separate smart device 152 for connectivity to the online meeting server 26. The alternative is possible as well where the vehicle user 32 uses the separate smart device 152 for video only and the vehicle 22 for audio only, and the vehicle user 32 utilizes a single communications pathway to the online meeting server 26.

For a single online meeting, it is also possible to utilize two communications pathways. By way of example, FIG. 4 shows the vehicle user 32 using the separate smart device 152 for audio only with audio communicated between the separate smart device 152 and the online meeting server 26 through a first communications pathway 180, and the vehicle 22 for video only with video communicated between the vehicle 22 and the online meeting server 26 through a second communications pathway 182.

At this point, one should appreciate that the vehicle user 32 has a variety of operational combinations with the availability of both the vehicle 22 and the separate smart device 152. The particular use and configuration can be based on the strengths of each. For example, the sound system of the separate smart device 152 may be superior to that of the vehicle 22 so that the vehicle user 32 chooses to use the separate smart device 152 for audio. Additionally, the screen size of the vehicle 22 may be larger than that of the separate smart device 152 so that the vehicle user 32 chooses to use the vehicle 22 for video.

One should further appreciate that to initiate the online meeting, it was described above that the separate smart device 152 provided direction (e.g., a join command) to the vehicle 22 to enable the vehicle 22 to join the online meeting. It is also possible for vehicle 22 to initiate the online meeting. Here, suppose that the vehicle user 32 has a particular online meeting already programmed into the vehicle 22. For example, the vehicle user 32 may have an online meeting invite or a calendar entry already programmed into the processing circuitry 30 of the vehicle 22. Alternatively, the vehicle user 32 may enter an online meeting ID and/or other online meeting details into the vehicle in real time (e.g., using a robust touch screen interface of the vehicle 22). The vehicle user 32 then conveys the online meeting details 160 from the vehicle 22 to the separate smart device 152 (e.g., via cabling, Bluetooth, WiFi, etc.) to involve the separate smart device 152 in the online meeting. Further details will now be provided with reference to FIG. 5.

Figure 5:
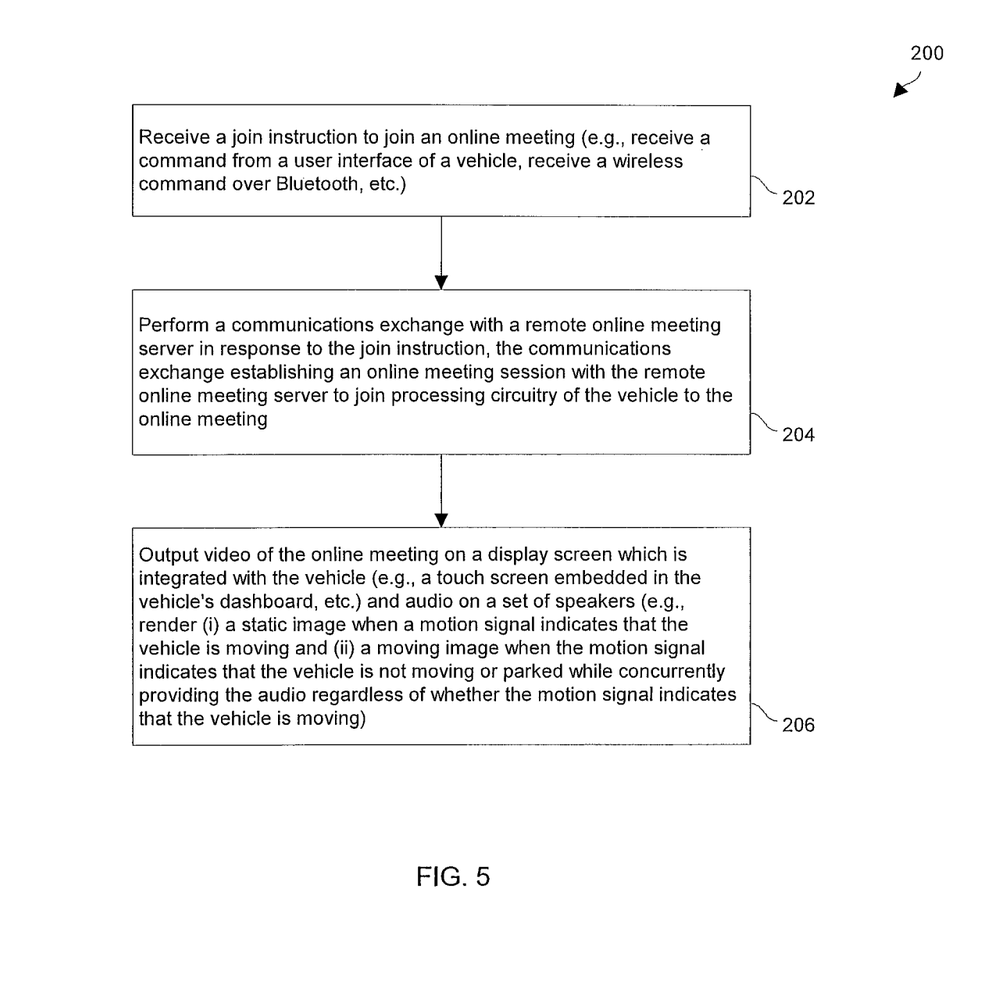
FIG. 5 is a flowchart of an online meeting procedure of which is performed by a vehicle.

FIG. 5 is a flowchart of a procedure 200 which is performed by the processing circuitry 30 of a vehicle 22 to enable a vehicle user 32 to participate in an online meeting. At 202, the processing circuitry 30 receives a join instruction to join the online meeting.

At 204, the processing circuitry 30 performs a communications exchange with a remote online meeting server 26 in response to the join instruction. The communications exchange establishes an online meeting session with the remote online meeting server 26 to join the processing circuitry 30 of the vehicle 22 to the online meeting.

At 206, the processing circuitry 30 outputs video of the online meeting on a display screen which is integrated with the vehicle, and audio on a set of speakers. Along these lines, the processing circuitry 30 can render a static image on the display screen when a motion signal received by the processing circuitry 30 indicates that the vehicle 22 is moving, and a moving image on the display screen when the motion signal indicates that the vehicle 22 is not moving or is parked. Furthermore, the audio can be outputted by the set of speakers regardless of whether the motion signal indicates that the vehicle 22 is moving.

As described above, improved techniques enable vehicle users 32 to safely and effectively operate vehicles 22 while concurrently participating in online meetings. To this end, video of an online meeting can be displayed on an electronic display screen 60 which is integrated with a vehicle 22. While the vehicle 22 is in motion (i.e., while a vehicle user 32 drives and concurrently engages in the online meeting via audio), the video shows a static image. However, the vehicle 22 is not in motion (e.g., when the user has pulled over to the side of the road, when the user 32 is parked in a parking lot, etc.) the video is allowed to include moving images. Accordingly, the vehicle user 32 is able to utilize the display screen 60 of the vehicle 22 for an online meeting in a safe and law abiding manner.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the online meeting server 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular communications, POTs communications, combinations thereof, and so on.

Additionally, one should appreciate that vehicle users 32 may be required to actively operate vehicles 22 and thus must be sheltered from distractions such as moving video. However, as vehicles 22 become "smarter" (e.g., self-driving) over time, the amount of effort and attention required from vehicle users 32 may diminish. Thus, it should be understood that more video content can be provided to the vehicle users 32 to improve the vehicle users' overall experience in online meetings in a safe and law abiding manner over time.

For example, in initial implementations and/or use cases, the processing circuitry 30 may require the transmission of the vehicle 22 to be in park before allowing moving video to be displayed on the vehicle's display screen 60. However, as vehicles 22 become smarter with improved safety features, the processing circuitry 30 in later implementations and/or use cases may allow moving video to be displayed on the vehicle's display screen 60 simply when the vehicle 22 is stationary (e.g., stopped at a red light).

Moreover, in some arrangements, the vehicle 22 may be equipped to buffer a certain amount of video of an online meeting. Accordingly, if a vehicle user 32 is unable to view content while driving, the vehicle user 32 may have the option of pulling over and going back in time to view slides or other video that was missed. During such review, the processing circuitry 32 renders past content (e.g., video and perhaps even audio) which was recently received and buffered.

Additionally, it should be understood that the vehicle 22 may deem certain situations to be unsafe and prevent rendering of moving video on the integrated display screen 60. In these situations, the vehicle 22 may be able to override the processing circuitry 30 and disable rendering of moving video (e.g., make the screen go completely dark, etc.).

Furthermore, a variety of other techniques are suitable for providing a simpler or summarized video images for display when a vehicle 22 is moving. Such other techniques include displaying just slides and/or slide titles, dimming the display, blurring the image, darkening the display, and so on. Accordingly, the vehicle 22 enables a higher fidelity user interface while the vehicle 22 remains stationary. Such modifications and enhancements are intended to belong to various embodiments of the disclosure.

What is claimed is:

1. A method of participating in an online meeting, comprising:
   receiving, by processing circuitry of a vehicle, a join instruction to join the online meeting;
   performing, by the processing circuitry of the vehicle, a communications exchange with a remote online meeting server in response to the join instruction, the communications exchange establishing an online meeting session with the remote online meeting server to join the processing circuitry of the vehicle to the online meeting; and
   after the online meeting session is established, outputting, by the processing circuitry of the vehicle, video of the online meeting on a display screen which is integrated with the vehicle;
   wherein outputting the video of the online meeting on the display screen includes:
      receiving a motion signal indicating whether the vehicle is in motion,
      displaying first video of the online meeting on the display screen when the motion signal indicates that the vehicle is in motion, and
      displaying second video of the online meeting on the display screen when the motion signal indicates that the vehicle is not in motion, the second video being different than the first video.

2. A method as in claim 1 wherein displaying the first video signal when the motion signal indicates that the vehicle is in motion includes providing, as the first video, a static image signal to display a static image on the display screen when the motion signal indicates that the vehicle is in motion; and
   wherein displaying the second video signal when the motion signal indicates that the vehicle is not in motion includes providing, as the second video, a moving image signal to display a moving image on the display screen when the motion signal indicates that the vehicle is not in motion.

3. A method as in claim 2, further comprising:
   regardless of whether the motion signal indicates that the vehicle is in motion, outputting audio of the online meeting on a set of speakers while the video of the online meeting is concurrently outputted on the display screen.

4. A method as in claim 3 wherein outputting audio of the online meeting on the set of speakers includes providing audio of a person who is currently talking in the online meeting;
   wherein providing the static image signal to display the static image on the display screen includes constantly rendering a static video frame of the person who is currently talking in the online meeting to show no movement of the person who is currently talking when the motion signal indicates that the vehicle is in motion; and
   wherein providing the moving image signal to display the moving image on the display screen includes rendering a series of video frames of the person who is currently talking in the online meeting to show movement of the person who is currently talking when the motion signal indicates that the vehicle is not in motion.

5. A method as in claim 3 wherein outputting audio of the online meeting on the set of speakers includes providing audio of a person who is currently talking in the online meeting;
   wherein providing the static image signal to display the static image on the display screen includes constantly rendering a picture icon of the person who is currently talking in the online meeting to show no movement of the person who is currently talking when the motion signal indicates that the vehicle is in motion; and
   wherein providing the moving image signal to display the moving image on the display screen includes rendering a series of video frames of the person who is currently talking in the online meeting to show movement of the person who is currently talking when the motion signal indicates that the vehicle is not in motion.

6. A method as in claim 3 wherein outputting audio of the online meeting on the set of speakers includes providing audio of a person who is currently talking in the online meeting;
   wherein providing the static image signal to display the static image on the display screen includes constantly rendering a static slide of an online meeting presentation when the motion signal indicates that the vehicle is in motion; and
   wherein providing the moving image signal to display the moving image on the display screen includes rendering a series of video frames to show movement when the motion signal indicates that the vehicle is not in motion.

7. A method as in claim 3 wherein performing the communications exchange includes:
   establishing, as the online meeting session, a cellular communications pathway between the processing circuitry of the vehicle and the remote online server, the cellular communications pathway carrying (i) audio data and video data from the processing circuitry of the vehicle to the remote online meeting server, and (ii) other audio data and other video data from the remote online meeting server to the processing circuitry of the vehicle.

8. A method as in claim 3 wherein the set of speakers is integrated with the vehicle; wherein the vehicle includes a radio tuner to receive and play broadcasted radio station content on the set of speakers; and wherein outputting the audio of the online meeting on the set of speakers includes:

disabling output of the radio tuner from playing broadcasted radio station content on the set of speakers and providing an audio signal of the online meeting to the set of speakers while the video of the online meeting is concurrently outputted on the display screen.

9. A method as in claim 3 wherein the set of speakers belongs to a smart portable device which is separate from the vehicle; and wherein outputting the audio of the online meeting on the set of speakers includes:

disabling vehicle speakers of the vehicle from outputting the audio of the online meeting and providing an audio signal of the online meeting to the set of speakers of the smart portable device while the video of the online meeting is concurrently outputted on the display screen.

10. A method as in claim 9 wherein the video of the online meeting is conveyed to the processing circuitry of the vehicle over a first communications pathway established between the processing circuitry of the vehicle and the remote online meeting server; and wherein the audio of the online meeting is conveyed to the smart portable device over a second communications pathway established between the smart portable device and the remote online meeting server, the first communications pathway and the second communications pathway being different from each other and co-existing.

11. A method as in claim 9 wherein receiving the join instruction to join the online meeting includes:

obtaining the join instruction from the smart portable device via a local communications pathway between the smart portable device and the processing circuitry of the vehicle.

12. A method as in claim 9, further comprising:

prior to providing the audio signal of the online meeting to the set of speakers of the smart portable device, sending a command from the processing circuitry of the vehicle to the smart portable device via a local communications pathway between the processing circuitry of the vehicle and the smart portable device to direct the smart portable device to join the online meeting.

13. A method as in claim 1, further comprising:

outputting audio of the online meeting on a set of speakers while the video of the online meeting is concurrently outputted on the display screen; and wherein outputting the video of the online meeting further includes showing, in a name field on the display screen which is integrated with the vehicle, a name of a person currently speaking in the online meeting, contents of the name field dynamically changing as different people speak during the online meeting.

14. A method as in claim 1 wherein forward and backward audio system navigation buttons are integrated with the vehicle; and wherein outputting the video of the online meeting further includes:

in response to user commands entered via the forward and backward audio system navigation buttons, re-displaying earlier outputted video of the online meeting on the display screen which is integrated with the vehicle.

15. A method as in claim 1 wherein forward and backward audio system navigation buttons are integrated with the vehicle; and wherein outputting the video of the online meeting further includes:

in response to user commands entered via the forward and backward audio system navigation buttons, displaying various thumbnail images of the online meeting on the display screen which is integrated with the vehicle.

16. A method as in claim 1 wherein the processing circuitry of the vehicle is separate and distinct from an engine controller of the vehicle; and wherein receiving the motion signal indicating whether the vehicle is in motion includes:

acquiring, by the processing circuitry of the vehicle, an electronic signal from the engine controller, the electronic signal indicating whether the vehicle is currently in motion.

17. A vehicle, comprising:

a passenger compartment which includes a display screen;

a drive section which is constructed and arranged to move the passenger compartment among different locations; and processing circuitry coupled to the passenger compartment and the drive section, the processing circuitry being constructed and arranged to:

receive a join instruction to join the online meeting, perform a communications exchange with a remote online meeting server in response to the join instruction, the communications exchange establishing an online meeting session with the remote online meeting server to join the processing circuitry of the vehicle to the online meeting, and after the online meeting session is established, output video of the online meeting on the display screen;

wherein the processing circuitry, when outputting the video of the online meeting on the display screen, is constructed and arranged to:

receive a motion signal from the drive section, the motion signal indicating whether the vehicle is in motion, display first video of the online meeting on the display screen when the motion signal indicates that the vehicle is in motion, and display second video of the online meeting on the display screen when the motion signal indicates that the vehicle is not in motion, the second video being different than the first video;

wherein the passenger compartment includes:

a set of speakers, and a radio tuner constructed and arranged to play broadcasted radio station content on the set of speakers; and wherein the processing circuitry is further constructed and arranged to:

regardless of whether the motion signal indicates that the vehicle is in motion, output audio of the online meeting on the set of speakers while the video of the online meeting is concurrently outputted on the display screen.

18. A vehicle as in claim 17 wherein forward and backward audio system navigation buttons are integrated with the vehicle; and wherein the processing circuitry, when outputting the video of the online meeting on the display screen, is further constructed and arranged to:

show, in a name field on the display screen, a name of a person currently speaking in the online meeting, contents of the name field dynamically changing as different people speak during the online meeting, and in response to user commands entered via the forward and backward audio system navigation buttons, at least one of (i) re-displaying earlier outputted video of the online meeting on the display screen which is integrated with the vehicle, and (ii) displaying various thumbnail images of the online meeting on the display screen which is integrated with the vehicle.

19. A vehicle as in claim 17 wherein, when receiving the motion signal indicating whether the vehicle is in motion, the processing circuitry is constructed and arranged to:
acquire an electronic signal from an engine controller of the drive section, the electronic signal indicating whether the vehicle is currently in motion.

20. A computer program product having a non-transitory computer readable medium which stores a set of instructions to involve a participant in an online meeting, the set of instructions, when carried out by processing circuitry of a vehicle, causing the processing circuitry of the vehicle to perform a method of:
receiving a join instruction to join the online meeting;
performing a communications exchange with a remote online meeting server in response to the join instruction, the communications exchange establishing an online meeting session with the remote online meeting server to join the processing circuitry of the vehicle to the online meeting; and
after the online meeting session is established, outputting video of the online meeting on a display screen which is integrated with the vehicle;
wherein outputting the video of the online meeting on the display screen includes:
receiving a motion signal indicating whether the vehicle is in motion,
displaying first video of the online meeting on the display screen when the motion signal indicates that the vehicle is in motion, and
displaying second video of the online meeting on the display screen when the motion signal indicates that the vehicle is not in motion, the second video being different than the first video; and
wherein the method further includes:
regardless of whether the motion signal indicates that the vehicle is in motion, outputting audio of the online meeting on a set of speakers while the video of the online meeting is concurrently outputted on the display screen.

21. A computer program product as in claim 20 wherein the processing circuitry of the vehicle is separate and distinct from an engine controller of the vehicle; and wherein receiving the motion signal indicating whether the vehicle is in motion includes:
acquiring an electronic signal from the engine controller, the electronic signal indicating whether the vehicle is currently in motion.

\* \* \* \* \*